United States Patent [19]
Ollendorf

[11] 3,847,208
[45] Nov. 12, 1974

[54] STRUCTURAL HEAT PIPE

[75] Inventor: Stanford Ollendorf, Silver Spring, Md.

[73] Assignee: The United States of America as represented by the National Aeronautics and Space Administration, Washington, D.C.

[22] Filed: Sept. 14, 1973

[21] Appl. No.: 397,476

[52] U.S. Cl................ 165/1, 138/113, 138/114, 138/148, 220/15, 165/47, 165/105, 244/1 SC
[51] Int. Cl.............................................. F28d 15/00
[58] Field of Search............ 165/105, 47, 1; 220/15; 244/1 SS, 1 SC; 138/111, 112, 113, 114, 148

[56] References Cited
UNITED STATES PATENTS

| 3,152,774 | 10/1964 | Wyatt | 244/1 SC |
|---|---|---|---|
| 3,724,228 | 4/1973 | Sollami et al. | 220/15 X |
| 3,749,156 | 7/1973 | Eby et al. | 244/1 SC X |
| 3,749,163 | 7/1973 | Waters | 165/105 X |
| 3,793,976 | 2/1974 | Kleinmann | 220/15 X |

FOREIGN PATENTS OR APPLICATIONS

| 556,635 | 2/1957 | Italy | 220/15 |
|---|---|---|---|

Primary Examiner—Albert W. Davis, Jr.
Attorney, Agent, or Firm—Robert F. Kempf; John R. Manning; John H. Warden

[57] ABSTRACT

A combined structural reinforcing element and heat transfer member is disclosed for placement between a structural wall of a container or housing which is to be thermally protected and an outer insulation blanket disposed thereover and spaced apart therefrom. The element comprises a heat pipe, one side of which supports the outer insulation blanket, the opposite side of which is connected to the structural wall. Heat penetrating through the outer insulation blanket directly reaches the heat pipe and is drawn off, thereby reducing thermal gradients in the structural wall. The element, due to its attachment to the structural wall, further functions as a reinforcing member therefor.

5 Claims, 3 Drawing Figures

PATENTED NOV 12 1974　　　3,847,208

3,847,208

STRUCTURAL HEAT PIPE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention broadly relates to thermal insulation systems and is directed to a combination structural reinforcing element for a wall of a thermal container or housing, and heat transfer member by which heat leakage through an outer insulation blanket surrounding the housing is rapidly drawn off to reduce thermal gradients in the housing wall. The invention has particular applicability with respect to thermal insulation systems utilized with spacecraft.

The design of spacecraft equipment requires detailed consideration of problems relating to temperature control thereof. For example, the impingement of direct sunlight on the spacecraft during flight may effect overheating of a portion of the craft and creates a requirement for balancing the skin or structural wall temperature over the entire surface of the spacecraft. In an effort to reduce the adverse affects of direct sunlight or other thermal sources, most spacecraft equipment covers incorporate a surrounding outer reflective insulation blanket or shield. Attachment of this outer insulation blanket to the underlying structural wall of the spacecraft is typically effected through the provision of a separate connecting element such as a pin or rivet and a separate structural support member, which are attached to the spacecraft wall and which supports the outer insulation blanket or other hardware and simultaneously provides a degree of structural reinforcement of the spacecraft skin. The pins or rivets and the separate structural support elements, however, act as thermal "shorts" to the outside environment, thus reducing the effectiveness of the multi-layer insulation and creating temperature gradients in the spacecraft skin.

So as to reduce these temperature gradients, it has been suggested that a separate retro-fitted heat pipe be disposed near the structural connecting element, which heat pipe acts as a heat drain. Yet, even this suggested improvement is not without its own disadvantages, however, as the addition of a separate retro-fitted heat pipe which is to be added to the spacecraft as a non-structural element increases the cost and the weight of the craft and further, does not entirely eliminate the problem of adverse temperature gradients.

SUMMARY OF THE INVENTION

It is therefore apparent that a need still exists in the art for a new approach to the problem of attaching outer hardware such as a thermal insulation blanket to a spacecraft wall or a wall of a container or housing, an approach which does not suffer the disadvantages of increased cost and weight, and reduced thermal effectiveness. It is the primary objective of the instant invention to provide such an improved structural support member.

A further objective of the instant invention is the provision of a combined structural reinforcing element and heat transfer member which, in a single element, provides the function of a separate structural support member, of a separate connecting element, and of a separate heat pipe, the single element of the invention eliminating the disadvantages associated with the separate structures.

These objects, as well as others which will become apparent as the description proceeds, are implemented by the subject invention which broadly comprises a heat pipe fastened such that the pipe supports an insulation system on one side, while the opposite side of the heat pipe acts as a structural reinforcing member, the single heat pipe reducing thermal gradients in the wall of the spacecraft or housing, and further reducing the cost and the weight of the overall system.

BRIEF DESCRIPTION OF THE DRAWINGS

The invention will be better understood, and further features and advantages thereof will become apparent, from the following detailed description of a preferred inventive embodiment, such description making reference to the appended sheet of drawings, wherein.

DETAILED DESCRIPTION OF A PREFERRED INVENTIVE EMBODIMENT

Figure 1:
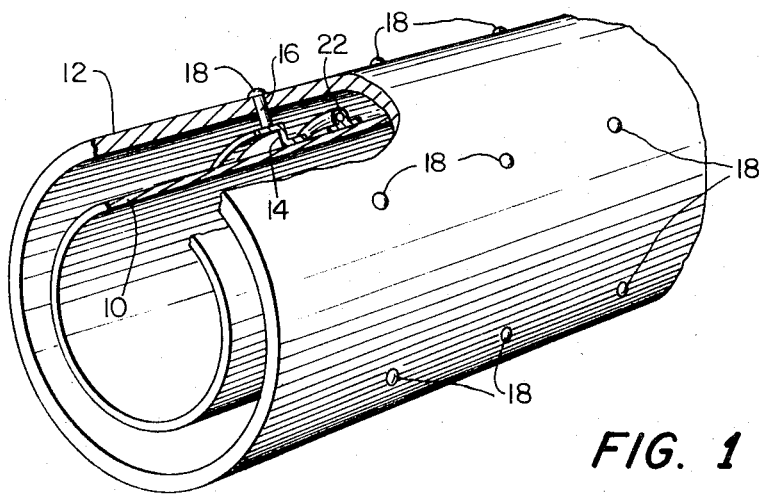
FIG. 1 is a perspective view, partially broken away for illustrative clarity, of a thermal insulation system and attachment technique therefor surrounding the skin or outer wall of a spacecraft.

With reference now to the drawings, and particularly to FIG. 1 thereof, a schematic illustration is provided of a piece of spacecraft equipment covered with a thermal insulating blanket. In this respect, the outer structural wall or skin of the spacecraft is designated by reference numeral 10, and an outer insulation blanket 12 is typically disposed over the skin 10 and spaced apart therefrom. The insulation blanket 12 is of conventional construction and typically comprises a multi-layer blanket of aluminized Mylar, for example, so as to reflect sunlight impinging thereon and so as to insulate the spacecraft skin.

Figure 2:
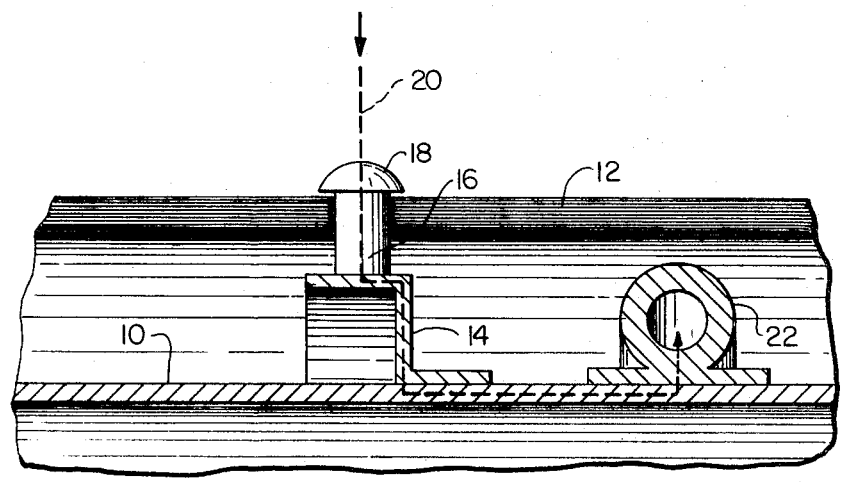
FIG. 2 is an elevational view, in section, showing details of one technique of attaching an outer thermal blanket to the structural skin of a spacecraft or housing.

With reference now to FIG. 2 of the application drawings, in addition to FIG. 1, one improved technique by which the outer thermal blanket 12 can be attached to the spacecraft wall 10 is shown. This technique, as will be seen, itself represents an improvement over the prior art approaches in that the function of a separate pin or rivet and a separate structural support member has been combined.

A structural metallic element such as is designated by reference numeral 14 is attached at one end thereof to the skin or outer wall 10 of the spacecraft, the other end of the structural element 14 incorporating a projecting pin or rivet 16 which is adapted to be disposed through corresponding and aligned holes in the thermal blanket 12 as is shown, the rivet or pin 16 thereafter accepting an end cap 18 which firmly holds the insulation blanket 12 in place. Structural element 14 can constitute a continuous metallic piece encircling the entire outer periphery of the spacecraft wall 10 as is shown, or alternatively could comprise a plurality of discrete structural elements disposed at the requisite locations about the periphery of the spacecraft wall 10 so as to ensure proper support and securement of the thermal blanket 12.

With the system depicted in FIG. 2, the majority of the direct sunlight impinging upon the spacecraft is reflected by the thermal blanket 12. However, some heat leakage from the direct sunlight or other thermal energy source does occur as is schematically illustrated by reference numeral 20. Specifically, heat can be leaked into the system through a penetration in the outer blanket 12 following a path through the pin or rivet 16 and through the separate structural element 14 to the skin 10 of the spacecraft, the structural element 14 thereby acting as a thermal "short" to the outside environment, thus reducing the multi-layer insulation effectiveness.

To at least partially overcome this heat leakage problem, a separate and distinct heat pipe 22 is disposed adjacent or at least in the near vicinity to each structural element 14 as is shown in FIG. 2. Heat pipe 22 is an added or retro-fitted nonstructural element which accordingly increases the complexity of the design and further increases the cost and the weight of the insulation system. Further, and even with the provision of the separate heat pipe 22, thermal gradients still occur in the outer skin 10 of the spacecraft as is shown in FIG. 2, the area of the thermal gradients being in that region between the location of the structural element 14 and the heat pipe 22. Thus, this improved approach to the problem of supporting the outer thermal blanket 12 is not a totally effective one.

Figure 3:
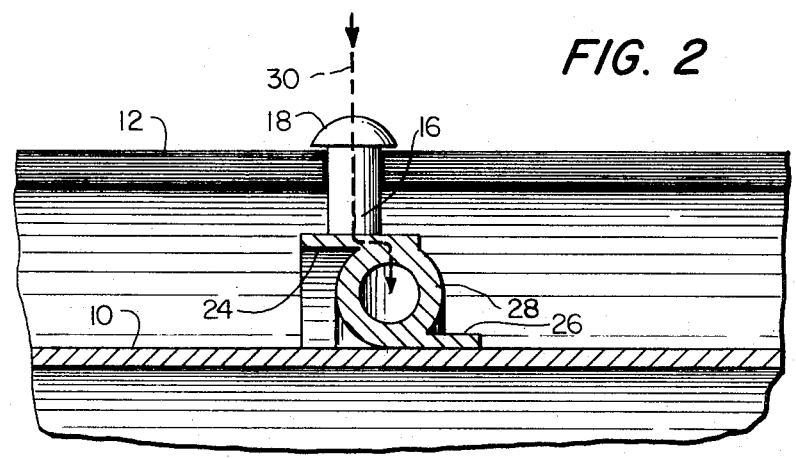
FIG. 3 is an elevational view, in section, showing details of the preferred attachment technique in accordance with the teachings of the instant invention.

The preferred embodiment of the instant invention contemplates the provision of a heat pipe which is fashioned such that the pipe itself supports an insulation system on one side thereof, while the opposite side of the pipe functions as a structural reinforcing member, thus reducing thermal gradients in the skin of the spacecraft and further reducing the cost and weight of the system. The preferred approach of the instant invention is that depicted in FIG. 3 of the application drawings.

Here, the outer insulation blanket 12 and the outer structural wall or skin of the spacecraft 10 are designated by the same reference numerals, as is the provision of a rivet or pin 16 disposed through various holes in the outer insulation blanket 12, each rivet or pin 16 constituting a fastening means and being closed by an end cap 18 as is conventional. Heat pipe 28, in accordance with the teachings of the instant invention, entirely takes the place of the separate structural element 14. Heat pipe 28 is preferably constructed so as to have a flange 24 on one side thereof to which the fastening means 16 is attached, and further having a flange 26 on the opposite side thereof which is coupled and attached to the skin 10 of the spacecraft. Heat pipe 28 and its associated flanges is contemplated to be constructed of extruded aluminum for convenience in manufacture. Heat pipe 28 is contemplated to contain conventional wicking materials and heat transfer fluids so as to act as a heat drain in typical fashion. The inside surface of the heat pipe 28 can additionally be longitudinally grooved, if desired, again in accordance with conventional techniques.

With the system of the instant invention, any radiant, convective or conductive heat leaking into the system as depicted by reference numeral 30 through a penetration in the blanket 12 immediately reaches the heat pipe portion 28 of the invention and is consequently drawn off to colder portions of the spacecraft. Thus, energy entering into the system which would cause gradients to occur with the approach of FIG. 2, is completely intercepted by the preferred construction of the instant invention.

Heat pipe 28 of the instant invention in addition to functioning as a support member for the outer thermal blanket 12 and as a heat transfer member for energy leaking into the system by penetration through the blanket 12, additionally functions as a structural reinforcement element for the outer wall 10 of the spacecraft, the structural reinforcement function being that which was previously achieved through the provision of separate element 14. Accordingly, the provision of a heat pipe such as heat pipe 28 disposed between the outer skin 10 of the spacecraft and the outer thermal blanket 12 provides multiple functions, that of support of the outer thermal blanket 12, that of structural reinforcement of the spacecraft wall 10, and that of a heat transfer medium for any leakage energy. Specifically, the heat pipe 28 of the instant invention performs all functions of the two separate elements 14 and 22 of FIG. 2 and improves upon the thermal heat transfer function by substantially reducing any thermal gradients in the outer skin 10 of the spacecraft. Further, in that only a single element is needed in accordance with the preferred technique of the instant invention, the cost and weight of the insulation system is substantially reduced.

Heat pipe 28 of the instant invention can typically constitute a circular closed-loop disposed about the periphery of the spacecraft, such loop either continuous or helical, or alternatively a plurality of separate loops can be provided as is typical. Additionally, and if desired, all heat pipes 28 can be coupled together to some common heat sink, again in accordance with conventional teachings.

While the invention has specifically been described with reference to a thermal insulation blanket attached to a wall of a spacecraft, the invention has applicability to ground based insulation systems such as would be utilized with cryogenic or other thermal containers.

From the foregoing detailed description, it should be apparent that all the objectives set forth at the outset of this specification have been successfully achieved. Moreover, while there has been shown and described a present preferred embodiment of the invention, it is to be distinctly understood by those skilled in the art that the invention is not limited thereto, but may otherwise be variously embodied and practiced within the scope of the following claims. ACCORDINGLY,

What is claimed is:

1. A combined structural reinforcing element and heat transfer member being placed between a structural wall of a housing and an outer insulation blanket disposed thereover and spaced apart therefrom, said element comprising a heat pipe, one side of said heat pipe supporting said outer insulation blanket, the opposite side of said heat pipe being connected to said structural wall to thereby provide structural reinforcement therefor, said element being such that heat penetrating through said outer insulation blanket reaches said heat pipe and is drawn off, thereby reducing thermal gradients in said structural wall of the housing.

2. An element as defined in claim 1, wherein said heat pipe has a flange on both sides thereof, one flange supporting said insulation blanket, the other flange being connected to said structural wall of the housing.

3. An element as defined in claim 2, wherein said one flange has attached thereto a fastening element for disposition through said insulation blanket to secure same about said structural wall of the housing.

4. An element as defined in claim 2, wherein both flanges and said heat pipe constitute a unitary metal structure.

5. A method of reducing thermal gradients in the wall of a housing caused by heat leakage through an outer insulation blanket surrounding the wall while simultaneously providing structural reinforcement of the wall, said method comprising the step of supporting the outer insulation blanket with a heat pipe attached to the wall and extending into cooler areas of said wall.

* * * * *